United States Patent
Carro

(10) Patent No.: US 7,864,929 B2
(45) Date of Patent: Jan. 4, 2011

(54) METHOD AND SYSTEMS FOR ACCESSING DATA FROM A NETWORK VIA TELEPHONE, USING PRINTED PUBLICATION

(75) Inventor: Fernando Incertis Carro, Valencia (ES)

(73) Assignee: Nuance Communications, Inc., Burlington, MA (US)

( * ) Notice: Subject to any disclaimer, the term of this patent is extended or adjusted under 35 U.S.C. 154(b) by 994 days.

(21) Appl. No.: 11/055,768

(22) Filed: Feb. 10, 2005

(65) Prior Publication Data

US 2005/0180401 A1  Aug. 18, 2005

(30) Foreign Application Priority Data

Feb. 13, 2004  (EP)  ................................. 04368008

(51) Int. Cl.
*H04M 1/64* (2006.01)
(52) U.S. Cl. ................. 379/88.04; 379/88.14; 704/246
(58) Field of Classification Search ................. 370/352; 379/88.01–88.04, 88.13, 88.14; 704/246
See application file for complete search history.

(56) References Cited

U.S. PATENT DOCUMENTS

| | | | |
|---|---|---|---|
| 5,097,528 A | 3/1992 | Gursahaney et al. | |
| 5,884,262 A * | 3/1999 | Wise et al. | ............... 704/270.1 |
| 5,953,392 A | 9/1999 | Rhie et al. | |
| 6,101,472 A | 8/2000 | Giangarra et al. | |
| 6,243,443 B1 | 6/2001 | Low et al. | |
| 6,321,209 B1 * | 11/2001 | Pasquali | ................... 705/14.73 |
| 6,400,806 B1 * | 6/2002 | Uppaluru | .................. 379/88.02 |
| 6,405,123 B1 * | 6/2002 | Rennard et al. | ............. 701/200 |
| 6,600,736 B1 * | 7/2003 | Ball et al. | .................... 370/352 |
| 6,606,611 B1 | 8/2003 | Khan et al. | |
| 6,658,389 B1 * | 12/2003 | Alpdemir | ..................... 704/275 |
| 6,895,084 B1 | 5/2005 | Saylor et al. | |
| 7,457,397 B1 | 11/2008 | Saylor et al. | |
| 2001/0053252 A1 | 12/2001 | Creque | |
| 2002/0062393 A1 * | 5/2002 | Borger et al. | ............... 709/246 |
| 2002/0065828 A1 | 5/2002 | Goodspeed | |
| 2002/0077086 A1 | 6/2002 | Tuomela et al. | |
| 2003/0024975 A1 | 2/2003 | Rajasekharan | |
| 2003/0078779 A1 | 4/2003 | Desai et al. | |
| 2005/0015256 A1 * | 1/2005 | Kargman | ..................... 704/272 |
| 2005/0138562 A1 * | 6/2005 | Carro | ......................... 715/734 |

* cited by examiner

*Primary Examiner*—Simon Sing
(74) *Attorney, Agent, or Firm*—Wolf, Greenfield & Sacks, P.C.

(57) ABSTRACT

A method and systems to access information related to items printed on publications by voice commands generated by a user through a telephone. To access additional information, the user dials on a telephone the Interactive Voice Response (IVR) service identifier and the publication identifier. A publication link table is associated to the publication identifier and provides a list of the item names on the selected publication. The IVR recognizes the name of the item pronounced by the user and determines the address associated to this name. The proxy server accesses the information located at this address and forwards it to the IVR wherein it is converted by a text-to-speech for the user's telephone.

18 Claims, 4 Drawing Sheets

METHOD AND SYSTEMS FOR ACCESSING DATA FROM A NETWORK VIA TELEPHONE, USING PRINTED PUBLICATION

RELATED APPLICATION

This application claims priority to European Application No. 04368008.1, filed Feb. 13, 2004, the entire contents of which are hereby incorporated by reference herein.

FIELD OF THE INVENTION

The present invention relates generally to publishing systems and to methods for retrieving information in a network, and more particularly, to a method and systems for accessing data in a network such as the Internet, and delivering this data to a user through a telephone, this data being related with items of printed publications, in response to the users verbal telephonic requests for these items.

BACKGROUND OF THE INVENTION

Recently an enormous amount of hypermedia information combining text, images and sounds is accessible via the Internet on the World Wide Web, mainly due to the widespread use of personal computers and the universal access of millions of users to the World Wide Web. Given the amount of information now readily available on the Internet, having the ability to access the Internet becomes a matter of convenience as well as a matter of having access to an invaluable information source.

While the growth of the Internet as a global medium for communications and commerce has been driven, in part, by the increased availability of personal computers, the access to the Internet over a personal computer is limited because the user must have access to a computer equipped with the adequate software, a working Internet connection, and is expected to have a certain level of computer expertise before successfully accessing, or browsing, the wide range of available information. If the user does not have the necessary hardware and the appropriate software to direct the computer to establish a connection to Internet via a modem or a direct connection, the user would then have no other means available for accessing the Internet. While wireless access to the Internet over cellular telephones or other handheld devices has the potential to resolve the mobility and connectivity issues resulting from Internet access over personal computers, the displays of these devices are small and the ability to input information using portable or virtual keyboards is constrained, limiting the usability and convenience of such approaches. Therefore, the goal of anytime and anywhere access to a wide variety of information and services on the Internet is not yet fully realized.

In a parallel direction, a vast array of telephony based technologies, like answering machines, voice mail, automated call dispatching, forwarding services, Interactive Voice Response (IVR), and the Voice Web have been deployed to increase the utility of telephones. Each of these devices or services intends to increase the usefulness of the telephone in a specific way.

IVR systems can include automated processing systems capable of carrying out operations in response to the human voice or dual tone multi-frequency (DTMF) tones, also known as touch tones, throughout a telephone network. IVRs using DTMF computer menu systems or voice-recognition engines are commonly used to help in responding to telephone inquiries without requiring any human operator. Most people are familiar with automated telephone services provided by IVR systems. For example, these services allow users to retrieve information like bank balances, flight schedules, and movie show times from any telephone. IVR systems give access to information and services through a simple touch-tone telephone to customers 24-hours a day, 7-days a week. Another example of IVRs consists in voice-activated dialers which respond to user speaking names of persons to be called, by automatically dialing the appropriate telephone numbers.

The explosive growth of Internet and World Wide Web technologies, combined with the availability of IVR systems, has shifted the landscape for providers of traditional phone services to a new set of customers accessing information and services through the Web. While in most cases customers still access automated services through the phone, providers are finding it easier to build new services that exploit the power of Web technology. Consequently, rapid progress is being made in the development of a "voice web". The voice web intends to be analogous to (and possibly integrated with) the well-known World Wide Web. However, the information maintained on the voice web will be primarily in audible form, and users can access them using speech commands and/or DTMF tones.

Even if the public's enthusiasm for new computer-based multimedia services has been seen by many analysts as a threat to the conventional forms of hard-copied publishing, particularly book publishing, reading a printed publication cannot be compared with reading an electronic media. Reading manuals and reports at work, textbooks at school, and menus at restaurants, and more generally reading printed material at any time and in any place is part of our daily life. People can browse very easily through paper catalogs, magazines, newspapers, maps and books by flipping through the pages and by "glancing" at pictures and text. It is also very easy for them to mark and return to specific parts of a physical document. When comparing paper based information with computer based information, paper has a number of useful properties that computers cannot provide, such as, paper is portable, familiar and can be easily distributed;

paper is easy to read, browse, mark, and manipulate.

Hence, even if electronic media presents the advantage of being easily updated, electronic media does not replace paper for most people, whether they are familiar with computers or not, and nothing leads one to foresee a general and massive replacement of paper books by electronic books in a near future.

Therefore, printed data and electronic data have to be considered as being more complementary than equivalent and thus, must be adequately combined. For example, digital information can be accessed for completing printed documents so as to enhance traditional printed products with access to digitally stored information. The use of telephony and voice response systems to access and retrieve from the Web information related with a printed publication simplifies such access to complementary information, allowing an anywhere and anytime access.

SUMMARY OF THE INVENTION

Thus, it is a broad object of the invention to remedy the shortcomings of the prior art as described here above.

It is another object of the invention to improve the access by telephone users to information from a network, related to printed publications.

It is a further object of the invention to enhance traditional printed products by providing access to associated digitally stored information facilities.

It is still a further object of the invention to provide a method and systems for making available through a telephone network content resources related to items selected by users on printed publications.

The accomplishment of these and other related objects is achieved by a method, in a voice server connected to a network, for providing digital information associated to at least one item contained in a publication, to a user, via telephone, the digital information being stored in the network, the voice server having access to a publication link table associated to the publication, the publication link table comprising at least the one item and a corresponding network address wherein the digital information can be accessed, the method comprising the steps of, upon reception of an identifier of the publication in the voice server, establishing a list of the items of the publication link table, corresponding to the publication identifier, upon reception of utterances in the voice server, determining if the utterances correspond to at least one item of the list of items, if the utterances correspond to at least one item of the list of items, determining if one network address is associated to the at least one item, if one network address is associated to the at least one item, accessing the digital information from the network address; and transmitting the accessed digital information to the user.

Further advantages of the present invention will become apparent to the ones skilled in the art upon examination of the drawings and detailed description. It is intended that any additional advantages be incorporated herein.

DETAILED DESCRIPTION OF THE PREFERRED EMBODIMENT

According to the present invention there is provided a method and systems to access information related to items printed on publications, or any kind of hard-copy document, from a network, by means of voice commands generated by the user through a telephone, pronouncing the name of these items.

Figure 1:
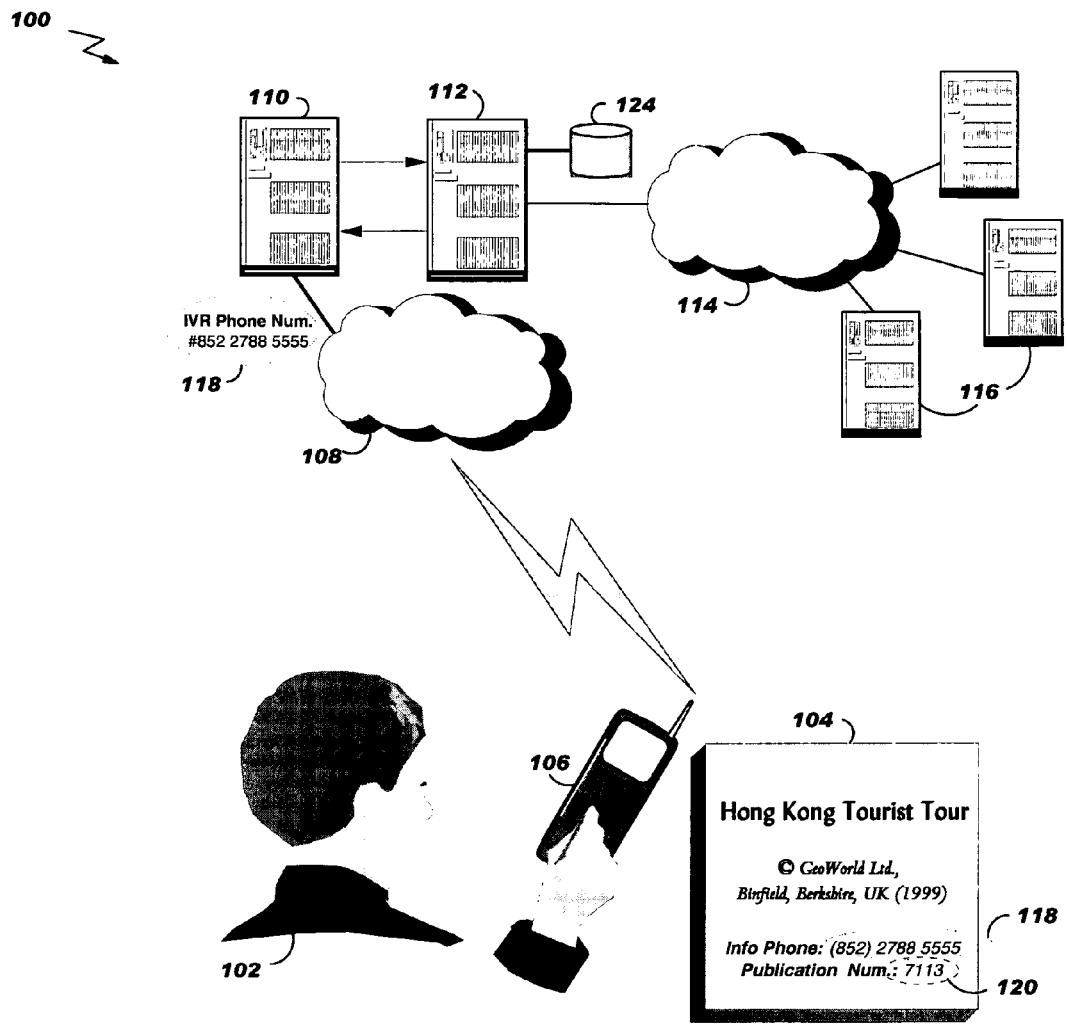
FIG. 1 illustrates a computer and telephony environment wherein the invention can be implemented.

FIG. 1 illustrates a computer and telephony environment 100 wherein the invention can be implemented. In such environment 100, a user 102 having access to a printed publication 104 can use a telephone 106 e.g., a mobile phone, to retrieve—via voice—information related to this printed publication 104. When dialing a particular phone number on the telephone 106, the user can access a voice server 110 through the telephone network 108. The voice server 110 is linked, via a proxy server 112, to the network 114 e.g., Internet, to which a plurality of Web servers 116 are connected. For sake of illustration, the voice server 110 comprises an IVR which phone number, or identifier, is #852 2788 5555, as shown with reference 118. The identifier of the IVR used to obtain digital information related to printed publication 104 is written on this printed publication 104, comprising also a publication identifier as illustrated with reference 120. Proxy server 112 is connected to database 124 that comprises information related to printed publication 104. It is to be noticed that database 124, containing information related to printed publication 104, can alternatively be connected to voice server 110. The IVR implemented in voice server 110 is used for interpreting dial tones and voice commands, accessing and retrieving documents from the web through the proxy server 112, for converting retrieved documents to synthesized speech, and for providing the selected, speech converted, documents to the user 102 through the telephone network 108.

The items associated to words, titles of pictures or other printed subjects to which additional digital information can be reached are marked on the printed publication using, for example, bold or color characters. Depending upon the system, the user can either pronounce the items itself or dial it on the telephone keyboards (in this last case, the items are preferably numerals).

In a preferred embodiment, when the user desires to access additional digital information of printed publications, he/she must dial the IVR identifier written on this printed publication, pronounce or dial the publication identifier (publication ID), or part number, when prompted and then the number of the page containing the item associated to this additional digital information or an identifier of this page (page ID). At this stage, he/she is requested to pronounce or dial the item as mentioned above. Preferably, publication identifier and selected page number, or identifier, are transmitted to the IVR server by means of dial tones e.g., as DTMF tones. The selected item name utterance received by the IVR server is recognized by means of a speech recognition unit, using a reduced grammar that includes a description of the words that are acceptable for the current recognition task, advantageously limited to the small vocabulary of the names of all items that have been defined by the editor on the selected page of the publication.

A publication link table is associated to each printed publication to which additional digital information is linked according to the invention. The publication link tables comprise a list of the items determined in each page of the publications, with the corresponding network addresses e.g., Uniform Resource Locators (URLs) for Internet network, wherein additional digital information can be retrieved using e.g., a proxy server. Items are grouped according to printed publication page identifiers. The list of items of a selected page is transmitted to the IVR server so as to determine the set of active vocabulary used by the speech recognition engine to recognize an item pronounced by the user. Since it is well known that the adaptation of a general purpose speech recognition system to a specific domain is an efficient method to improve speaker-independent speech recognition accuracy, the method of the invention uses the limited vocabulary of the names of all selectable items that have been defined by the editor on the publication's page selected.

Figure 2:
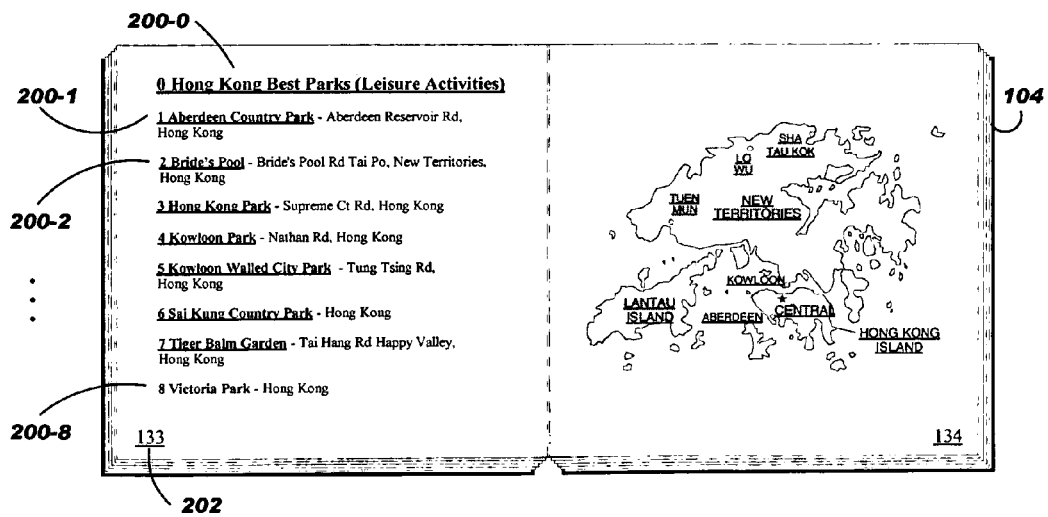
FIG. 2 shows a printed publication comprising items from which additional digital information can be reached.

FIG. 2 illustrates the printed publication 104, open at pages 133-134, comprising a plurality of items, generically referenced as 200, linked to additional digital information. For sake of illustration, the items are identified by underlined and bold characters. As discussed above, the user must call an IVR by using the phone number 118 printed on the publication 104, and then pronounces or dials the printed publication identifier 120, preferably the page identifier 202 and, the chosen item 200. The item can be pronounced e.g. "Bride's Pool", or the corresponding numeral can be dialed e.g., "2".

Figure 3:
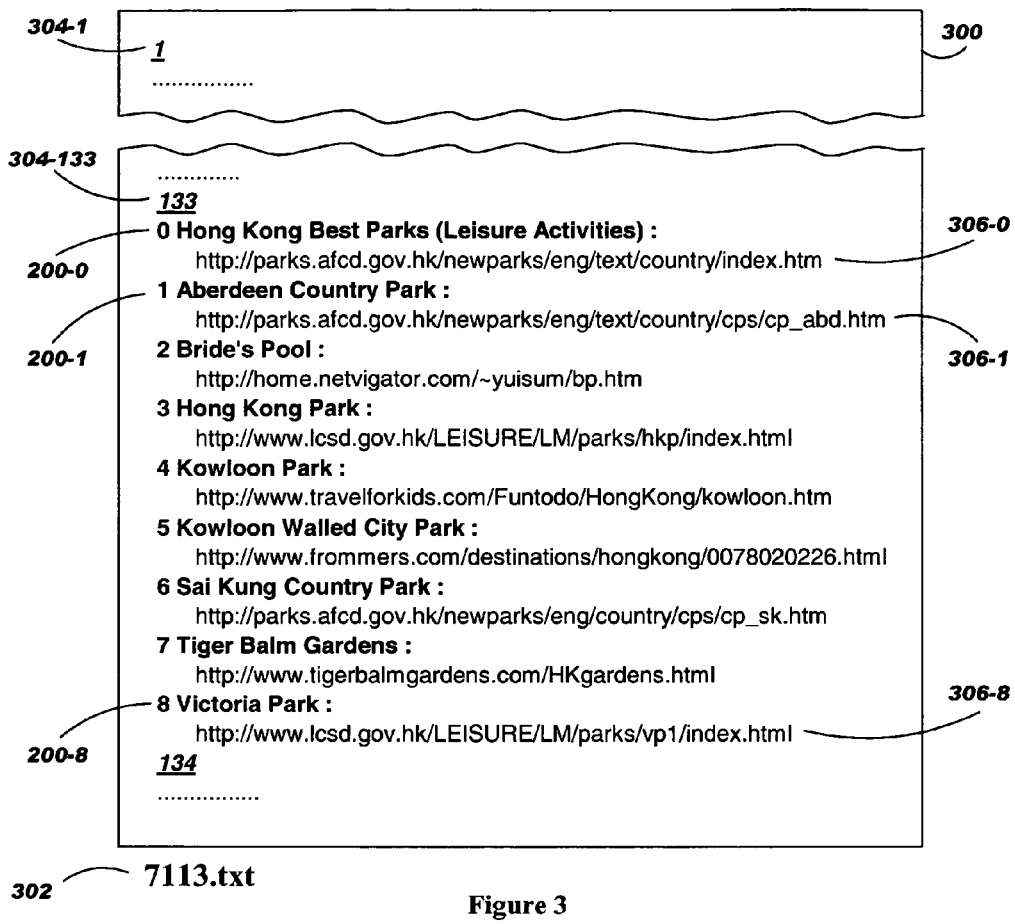
FIG. 3 shows partially the publication link table associated to printed publication of FIG. 2.

FIG. 3 shows partially the publication link table 300 associated to printed publication 104. In this example, the publication link table 300 is stored as a file which filename 302 comprises the printed publication ID. The publication link table 300 is divided in sections, each section corresponding to a page, generically referenced as 304, of the printed publication. Each section comprises at least a list of the items 200 shown on the corresponding page of the printed publication with a corresponding network address 306 wherein the corresponding additional digital information can be retrieved. Naturally, the number of sections can be smaller than the number of pages of the printed publication, particularly when there are pages of the printed publication that do not contain any item linked to additional digital information.

When an item 200 is recognized by the IVR, it is transmitted to the proxy server 112 that identifies the network address 306 of the additional digital information associated to the selected item 200, in the publication links table 300. A request is then sent to the identified server 116. The information received by the proxy server 112 is transmitted to the voice server 110 wherein the IVR is implemented. The information is transformed to speech by text-to-speech synthesis in the voice server 110 and transmitted to the telephone 106 of the user 102.

Therefore, according to the present invention, each printed publication from which a user can access additional digital information comprises at least a publication identifier and predetermined items. Preferably, each printed publication also comprises an IVR identifier that can be otherwise determined thanks to the publication identifier and page identifiers.

Figure 4:
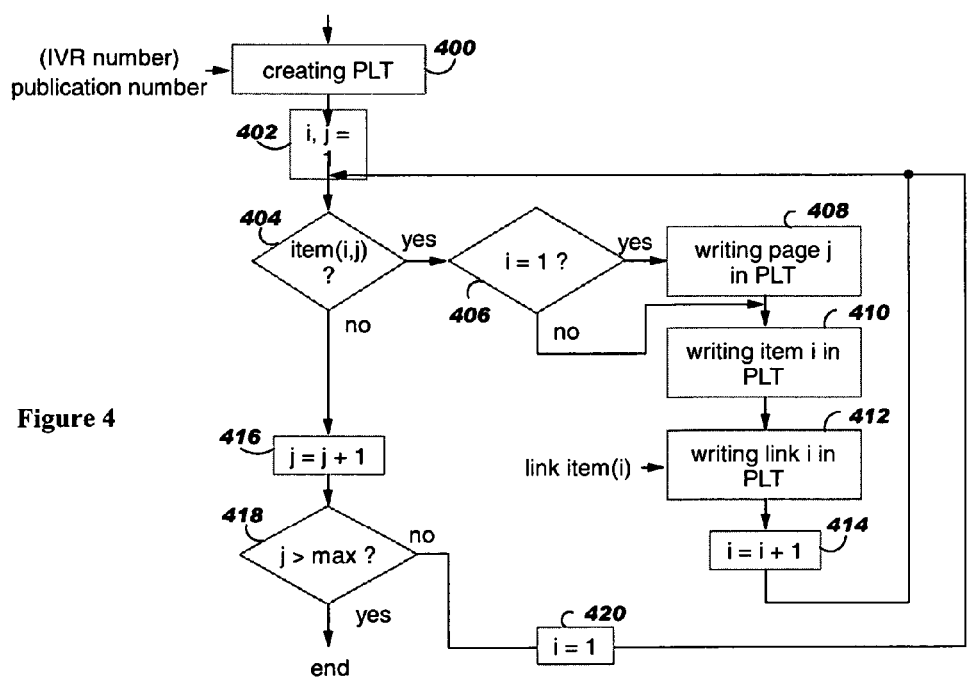
FIG. 4 depicts an example of the algorithm used for creating the publication link tables associated to the printed publications according to the invention.

FIG. 4 shows an example of the algorithm used for creating the publication link table associated to a printed publication according to the invention, on which an IVR identifier and a publication identifier are written and wherein items are highlighted. For the sake of clarity, a different Publication Link Table PLT is created for each printed publication, step 400, therefore, the publication identifier of the printed publication to which the PLT is associated, or a reference to this number, is encoded either in the PLT's filename or in the PLT itself. Optionally, the IVR identifier written on the printed publication can be encoded with the publication identifier. The variables i and j, representing the number of the item in the selected page and the page number, respectively, are both set to one in step 402. Then a first test is done to determine whether or not page j comprises an item i step 404. If page j does not comprise an item i, the page number j is incremented by one, step 416, and another test is done to compare j with the number max of page of the publication, step 418. If j is greater than max, the process stops. Else if j is not greater than max, variable i is reset to one in step 420, and the process is branched to the first test in step 404, as illustrated.

If page j comprises an item i, a new test is performed to determine whether or not this item is the first one found in page j i.e., if i is equal to one or not, step 406. If i is equal to one, the page number j is stored in the publication link table, step 408. Then, item i is stored in the publication link table, step 410, as well as its associated link, step 412. The link associated to item i can be entered by the user e.g., the user is prompted each time an item is found, or read in a computer memorization means such as a pre-processed associated link file. After an item and its associated link have been stored in the publication link table, variable i is incremented by one, step 414, and the process is branched to the first test, step 404, as illustrated.

If one publication link table is created for each printed publication in the previous example, it is naturally possible to group a plurality of publication link tables. In such case, it is necessary to add the publication identifier to corresponding parts of the PLTs e.g., to store the publication identifier when the first item of the first page is identified.

Figure 5:
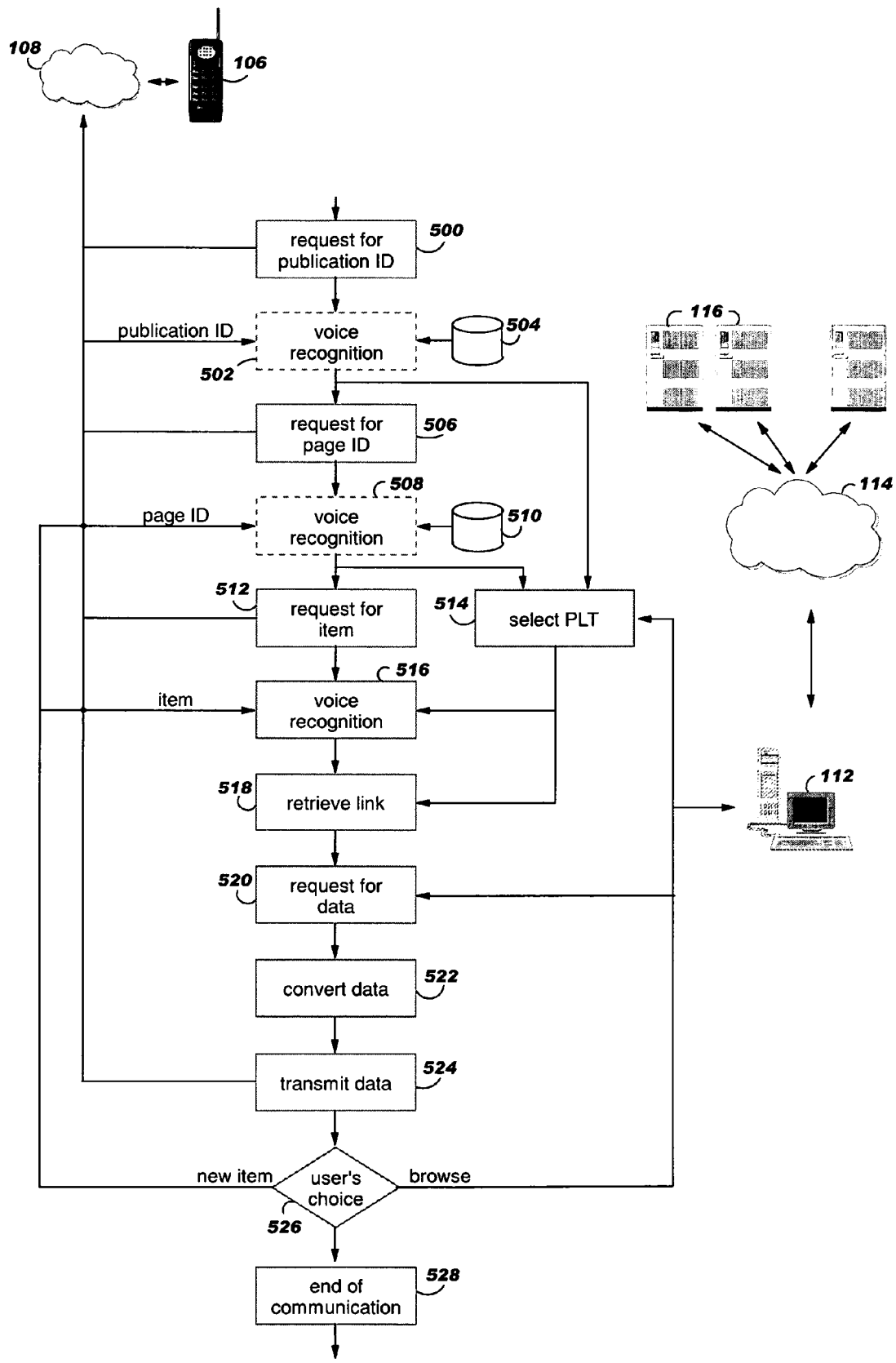
FIG. 5 depicts an example of the algorithm used for accessing additional digital information from a network via telephone, using a printed publication.

FIG. 5. depicts an example of the main part of the algorithm used for accessing additional digital information from a network via telephone, using a printed publication. The illustrated part is the one executed by the IVR in voice server 110.

After having answered the user's call, the IVR sends a request to the user's telephone 106, through the telephone network 108, for the publication identifier, step 500. The request consists in a verbal question that is either pre-recorded or generated by a text to speech translator. The publication identifier is either dialed by the user on the telephone 106 or pronounced in the telephone microphone. If the publication identifier is pronounced, it is interpreted by a standard voice recognition engine, step 502, using database 504, as illustrated with dotted line. Then, the IVR sends a second request to the user's telephone 106, through the telephone network 108, for the identifier of the page containing the item to which the user requests additional information, step 506. Similarly to the publication identifier request, the page identifier request consists in a verbal question that is either prerecorded or generated by a text to speech translator, the page identifier being either dialed or pronounced. If the page identifier is pronounced, it is interpreted by a standard voice recognition engine, step 508, using database 510. Then, the IVR sends a third request to the user's telephone 106, through the telephone network 108, for the item to which the user requests additional information, step 512. In parallel the IVR uses the publication and the page identifiers to get from the PLT the set of active vocabulary terms to be used by the speech recognition engine to recognize an item pronounced by the user, step 514. This restricts the number of items that can be recognized, step 516. As it is well known, reducing the set of words that are used by a voice recognition engine greatly improves the recognition accuracy.

When the item is identified, it is used by the IVR to recover the corresponding link, or address, stored in the publication link table, step 518. This address is then transmitted to proxy server 112, connected to global network 114, so as to retrieve the corresponding data located on server 116, step 520. When received, the data is preferably converted to speech in step 522 so as to be transmitted to the user's telephone 106 through the telephone network 108, step 524. If the data is not converted to speech, it can be, for example, displayed on the screen of the user's telephone. According to a preferred embodiment, the hyperlinks contained in the accessed data are converted in such a way that they can be easily recognized when heard. For example, standard data may be converted using a woman like voice while hyperlinks are converted using a man like voice, allowing the user to reach hyperlinked data. During the transmission of the converted data or after, the user can transmit commands to the IVR. The user can pronounce another item, in such case the process is branched either to step 508 if the item is located on another page or to step 516 if the item is located on the same page, to reach a hyperlinked document, or to end the communication, step 528. The choice in step 526 can be done either by dialing the command or by pronouncing predetermined words (words corresponding to the choice, items, or words corresponding to the hyperlinks).

As mentioned above, a page identifier is not always required since, for example, a publication can comprise few pages, few items, or the set of items can be common for all pages. In such case, the user can skip the request or, preferably, the IVR, having analyzed that not any page identifier is referenced in the publication link table, does not send a page identifier request. Likewise, a same page identifier can be used for a plurality of pages when, for example, the set of items is common for all these pages.

Figure 6:
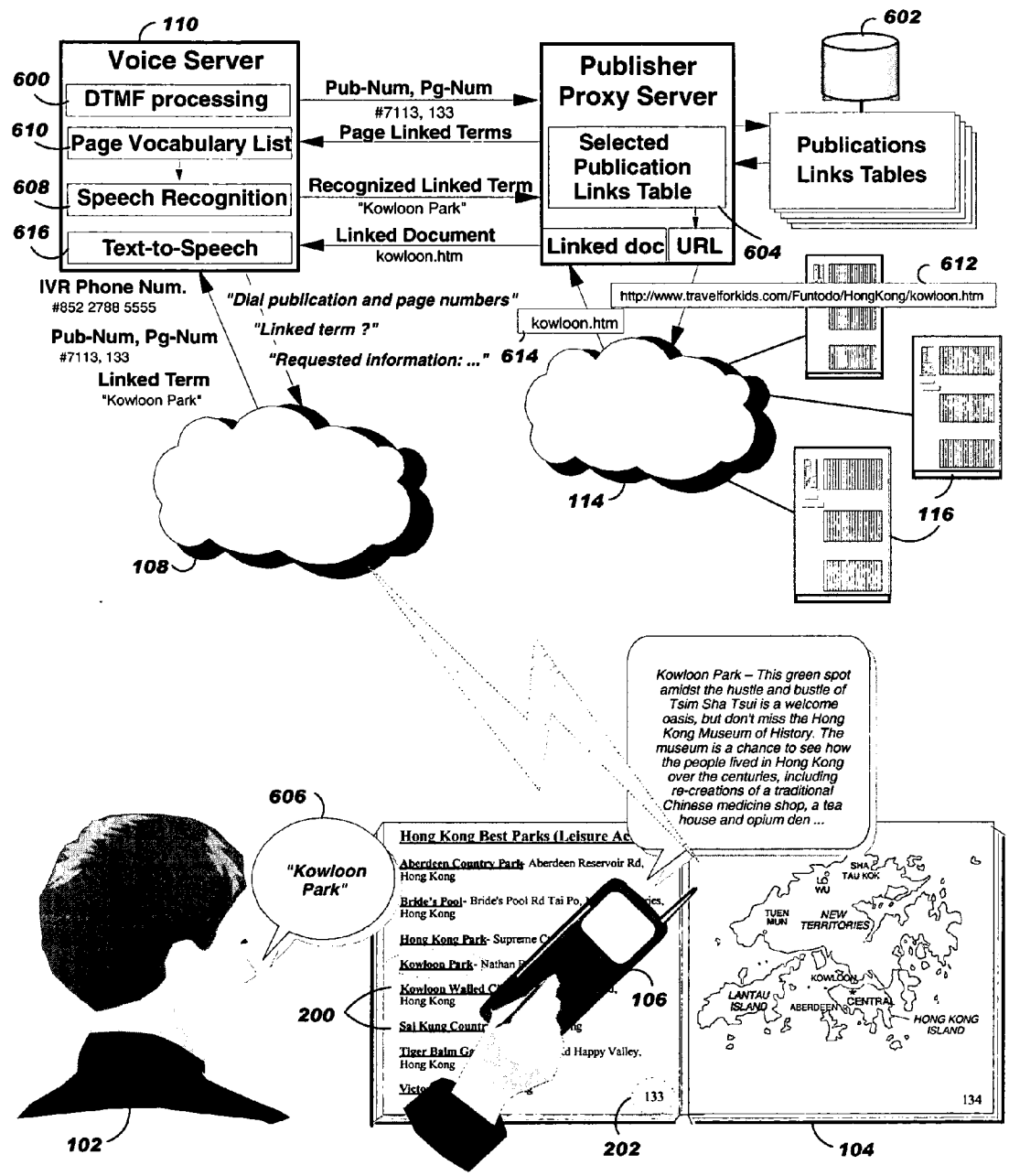
FIG. 6 illustrates an example of the use of the invention.

FIG. 6 illustrates an example of the use of the present invention according to the algorithm of FIG. 5. After having selected printed publication 104, comprising one or a plurality of pages, user 102 chooses page 202 and finds item 200 on it for which he/she desires additional information. To access the additional information, the user must first identify an IVR service identifier 118 and the publication identifier 120. After having dialed the IVR service identifier 118 on telephone 106, the user dials the publication identifier 120, followed by the selected page identifier 202, forming a dial string that is encoded by means of dial tones e.g., DTMF tones, and transmitted through the telephone network 108 to Voice Server 110. Upon reception of the dial string by a DTMF processing unit 600 of the Voice Server 110, the dial string is parsed and decoded to recover the publication identifier 120 and the selected page identifier 202.

Then, the publication link table associated to the received publication identification number is identified in the Publication Database 602 of the proxy server 112. A vocabulary list is extracted from the selected publication link table 604, listing the names of all items 200 defined on the publication's page 202 selected by the user. The user is then prompted to pronounce the name of the chosen item 200, the utterance 606 pronounced by the user is received by the voice server 110 through telephone network 108. This utterance 606 is recognized by means of speech recognition unit 608 using the vocabulary list 610 associated to the selected publication's page 202. Then, the proxy server 112 identifies the address 612 e.g. a URL, associated to the recognized item, using the selected publication link table 604. The proxy server 112 accesses the information 614 located on this identified address 612, through communication network 114 and forwards this accessed information 614 to the voice server 110 that converts it by means of a text-to-speech unit 616 to synthetic speech. The synthetic speech is then transmitted by the IVR to the user's telephone 106, through the telephone network 108, where it is outputted in the telephone speaker.

Naturally, in order to satisfy local and specific requirements, a person skilled in the art may apply to the solution described above many modifications and alterations all of which, however, are included within the scope of protection of the invention as defined by the following claims. In particular, it is to be noticed that, even if the description is based upon physical printed publication such as books or brochures, containing selectable items to which a user can obtain additional information, such items can also be contained in electronic publications accessible from network or from any kind of storage and displayed on computer screen, telephone screen, or any kind of displays.

What is claimed is:

1. A computer-implemented method for providing electronically stored information to a user via a telephone, the electronically stored information being associated with a printed publication, the printed publication having printed thereon an alphanumeric identifier and a plurality of information items associated with the alphanumeric identifier, the method comprising acts of:

receiving and electronically recording, by an information server, the alphanumeric identifier and the plurality of information items associated with the alphanumeric identifier;

receiving, by a voice server comprising a speech recognition unit and a text to speech unit, a first utterance pronounced by the user and transmitted via the telephone, the first utterance comprising the alphanumeric identifier from the printed publication;

recognizing, by the speech recognition unit of the voice server, the alphanumeric identifier from the first utterance received by the voice server;

receiving, by the voice server from the information server, the plurality of information items associated with the alphanumeric identifier recognized by the speech recognition unit of the voice server;

receiving, by the voice server, a second utterance pronounced by the user and transmitted via the telephone, the second utterance identifying at least one information item of the plurality of information items from the printed publication;

recognizing, by the speech recognition unit of the voice server, information identifying the at least one information item from the second utterance received by the voice server, using a reduced grammar based at least in part on the plurality of information items received by the voice server from the information server;

accessing, by the information server, the electronically stored information over at least one communication network, using a network address associated with the at least one information item recognized by the speech recognition unit of the voice server;

rendering, by the text to speech unit of the voice server, the electronically stored information accessed by the information server as a first audio signal; and transmitting, by the voice server, the first audio signal to the user via the telephone.

2. The method of claim 1, wherein:

the electronically stored information comprises explanatory information regarding the at least one information item and an index for additional explanatory information regarding the at least one information item; and the act of rendering, by the text to speech unit of the voice server, the electronically stored information comprises an act of rendering the index for additional explanatory information in a different type of voice than the explanatory information to alert the user that the index for additional explanatory information is a selectable index that enables the user to obtain the additional explanatory information.

3. The method of claim 2, further comprising acts of:

receiving, by the voice server, a third utterance pronounced by the user and transmitted via the telephone, the third utterance comprising a predetermined word in the index for additional explanatory information;

recognizing, by the speech recognition unit of the voice server, the predetermined word from the third utterance received by the voice server;

accessing, by the information server, the additional explanatory information over the at least one communication network, in response to recognizing the predetermined word in the index for additional explanatory information;

rendering, by the text to speech unit of the voice server, the additional explanatory information accessed by the information server as a second audio signal; and transmitting, by the voice server, the second audio signal to the user via the telephone.

4. The method of claim 3, wherein the electronically stored information is a web page and the index for additional explanatory information is a hyperlink on the web page.

5. The method of claim 1 further comprising acts of:
distributing the printed publication to the user; and
instructing the user to pronounce the first utterance comprising the alphanumeric identifier.

6. The method of claim 2 further comprising acts of:
distributing the printed publication to the user; and
instructing the user to pronounce the first utterance comprising the alphanumeric identifier.

7. The method of claim 1, wherein the voice server and the information server are formed by a single server.

8. The method of claim 1, wherein the alphanumeric identifier is not rendered as an option to the user by the voice server.

9. A system for providing electronically stored information to a user via a telephone, the electronically stored information being associated with a printed publication, the printed publication having printed thereon an alphanumeric identifier and a plurality of information items associated with the alphanumeric identifier, the system comprising:
a voice server comprising a speech recognition unit and a text to speech unit, the voice server adapted to receive a first utterance pronounced by the user and transmitted via the telephone, the first utterance comprising the alphanumeric identifier from the printed publication, wherein the speech recognition unit of the voice server is adapted to recognize the alphanumeric identifier from the first utterance received by the voice server; and
an information server adapted to transmit to the voice server the plurality of information items associated with the alphanumeric identifier recognized by the speech recognition unit of the voice server, wherein;
the information server is further adapted to receive and electronically record the alphanumeric identifier and the plurality of information items associated with the alphanumeric identifier;
the voice server is further adapted to receive a second utterance pronounced by the user and transmitted via the telephone, the second utterance identifying at least one information item of the plurality of information items from the printed publication;
the speech recognition unit of the voice server is further adapted to recognize information identifying the at least one information item from the second utterance received by the voice server, using a reduced grammar based at least in part on the plurality of information items retrieved by the information server;
the information server is further adapted to access the electronically stored information over at least one communication network, using a network address associated with the at least one information item recognized by the speech recognition unit of the voice server;
the text to speech unit of the voice server is adapted to render the electronically stored information accessed by the information server as a first audio signal; and
the voice server is further adapted to transmit the first audio signal to the user via the telephone.

10. The system of claim 9, wherein:
the electronically stored information comprises explanatory information regarding the at least one information item and an index for additional explanatory information regarding the at least one information item; and
the text to speech unit of the voice server is further adapted to render the index for additional explanatory information in a different type of voice than the explanatory information to alert the user that the index for additional explanatory information is a selectable index that enables the user to obtain the additional explanatory information.

11. The system of claim 10, wherein:
the voice server is further adapted to receive a third utterance pronounced by the user and transmitted via the telephone, the third utterance comprising a predetermined word in the index for additional explanatory information;
the speech recognition unit of the voice server is further adapted to recognize the predetermined word from the third utterance received by the voice server;
the information server is further adapted to access the additional explanatory information over the at least one communication network, in response to recognizing the predetermined word in the index for additional explanatory information;
the text to speech unit of the voice server is further adapted to render the additional explanatory information accessed by the information server as a second audio signal; and
the voice server is further adapted to transmit the second audio signal to the user via the telephone.

12. The system of claim 11, wherein the electronically stored information is a web page and the index for additional explanatory information is a hyperlink on the web page.

13. The system of claim 9, wherein the voice server and the information server are formed by a single server.

14. The system of claim 9, wherein the voice server does not render the alphanumeric identifier as an option to the user.

15. A system for providing electronically stored information to a user via a telephone, the electronically stored information being associated with a printed publication, the printed publication having printed thereon an alphanumeric identifier and a plurality of information items associated with the alphanumeric identifier, the system comprising:
a voice server comprising a speech recognition unit, a dual tone multi-frequency ("DTMF") unit and a text to speech unit, wherein the DTMF unit is adapted to receive a first DTMF entry transmitted from the user via the telephone, the first DTMF entry comprising the alphanumeric identifier from the printed publication, and wherein the speech recognition unit of the voice server is adapted to recognize the alphanumeric identifier from the first DTMF entry received by the DTMF unit of the voice server; and
an information server adapted to communicate with the voice server and to retrieve the plurality of information items associated with the alphanumeric identifier recognized by the speech recognition unit of the voice server, wherein;
the DTMF unit of the voice server is further adapted to receive a second DTMF entry transmitted from the user via the telephone, the second DTMF entry identifying at least one information item of the plurality of information items from the printed publication;
the speech recognition unit of the voice server is further adapted to recognize information identifying the at least one information item from the second DTMF entry received by the DTMF unit of the voice server, using a reduced grammar based at least in part on the plurality of information items retrieved by the information server;
the information server is further adapted to access the electronically stored information over at least one communication network, using a network address associated with the at least one information item recognized by the speech recognition unit of the voice server;

the text to speech unit of the voice server is adapted to render the electronically stored information accessed by the information server as a first audio signal; and the DTMF unit of the voice server is further adapted to transmit the first audio signal to the user via the telephone.

16. The system of claim 15, wherein:

the electronically stored information comprises explanatory information regarding the at least one information item and an index for additional explanatory information regarding the at least one information item; and the text to speech unit of the voice server is further adapted to render the index for additional explanatory information in a different type of voice than the explanatory information to alert the user that the index for additional explanatory information is a selectable index that enables the user to obtain the additional explanatory information.

17. The system of claim 15, wherein:

the DTMF unit of the voice server is further adapted to receive a third DTMF entry transmitted from the user via the telephone, the third DTMF entry comprising a predetermined word in the index for additional explanatory information;

the speech recognition unit of the voice server is further adapted to recognize the predetermined word from the third DTMF entry received by the DTMF unit of the voice server;

the information server is further adapted to access the additional explanatory information over the at least one communication network, in response to recognizing the predetermined word in the index for additional explanatory information;

the text to speech unit of the voice server is further adapted to render the additional explanatory information accessed by the information server as a second audio signal; and the DTMF unit of the voice server is further adapted to transmit the second audio signal to the user via the telephone.

18. The system of claim 15, wherein the voice server does not render the alphanumeric identifier as an option to the user.

* * * * *